Figure 1:
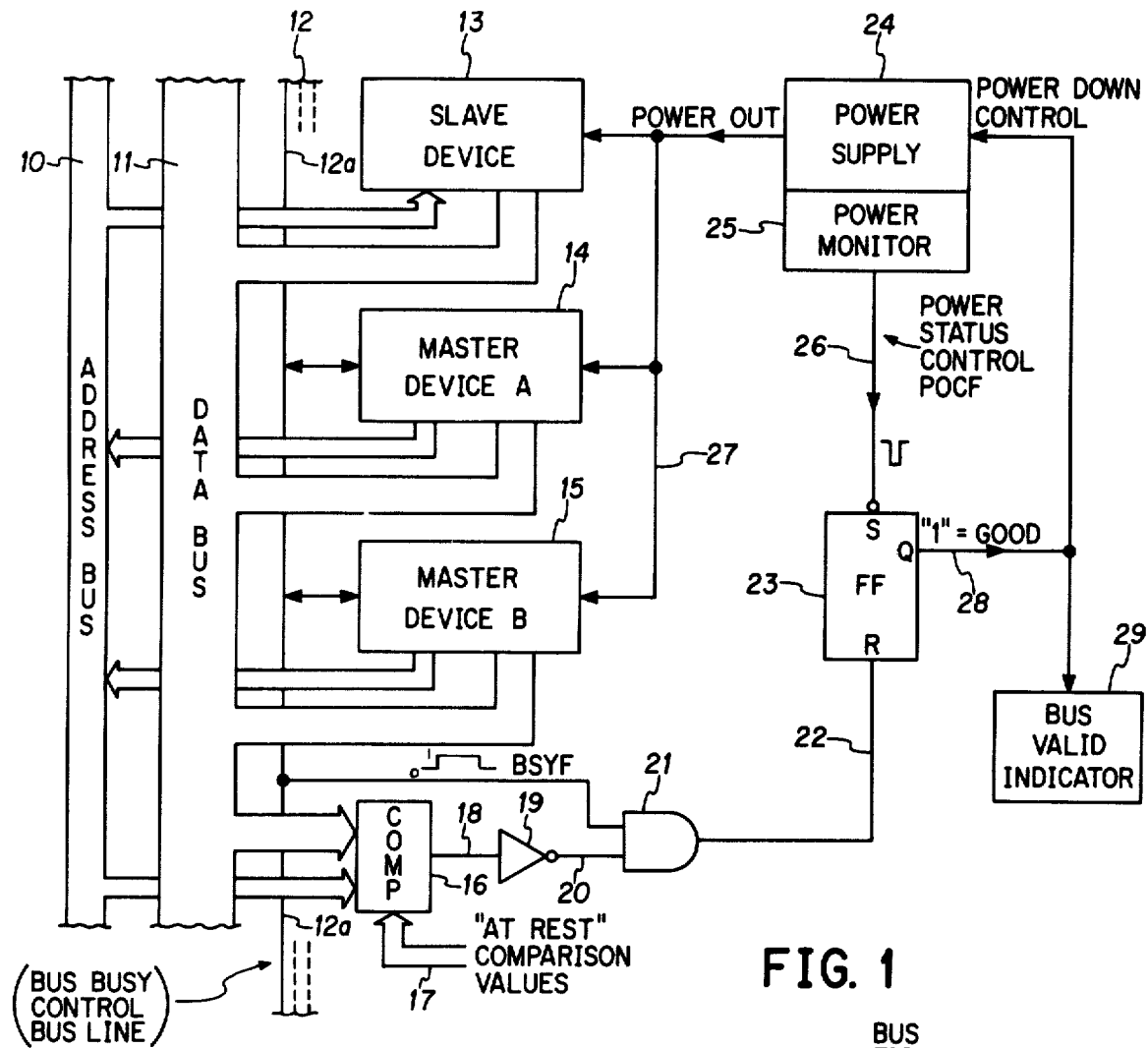

United States Patent [19]

Patterson

[11] 4,149,241
[45] Apr. 10, 1979

[54] COMMUNICATIONS BUS MONITOR
[75] Inventor: Robert A. Patterson, Marion, Iowa
[73] Assignee: Rockwell International Corporation, El Segundo, Calif.
[21] Appl. No.: 886,007
[22] Filed: Mar. 13, 1978
[51] Int. Cl.[2] .............................................. G06F 11/00
[52] U.S. Cl. .................................................. 364/200
[58] Field of Search ........................ 364/200 MS File
[56] References Cited
U.S. PATENT DOCUMENTS
3,810,120    5/1974    Huettner et al. ..................... 364/200

Primary Examiner—Harvey E. Springborn
Attorney, Agent, or Firm—Richard W. Anderson; Richard A. Bachand; H. Fredrick Hamann

[57] ABSTRACT

A monitor provides a continuously active assessment of the performance of a parallel communications bus by continuously comparing the binary level of the bus lines with system-defined levels which should be exhibited when the bus is in an "at rest" condition. Logic circuitry enables bus line logic level comparisons with "at-rest" condition reference values with any one discrepancy providing a latched invalid bus annunciation which is selectively enabled during periods when the bus is sensed to be in the "at-rest" condition.

2 Claims, 2 Drawing Figures

COMMUNICATIONS BUS MONITOR

BACKGROUND OF THE INVENTION

This invention relates generally to computer operation monitoring, and more particularly to a monitor providing a continuously active assessment of the performance of a parallel communications bus.

Monitoring of computer operations for assessment of reliability has been widely employed in the data communication arts. Numerous monitoring schemes are employed in computers whereby comparators are utilized for comparing data with a reference or nominal value and generating an error signal in the event of mismatch. Computer program subroutines are employed whereby, for example, the data stored in a particular memory address or in a complete memory bank might be periodically checked with comparison values to assure that the data stored matches that which was intended to be stored. In Auspurg U.S. Pat. No. 3,869,603, a test control includes a register for storing manual information applied in successive cycles to a storage unit under test, along with a comparator for comparing the nominal values read into a storage unit with the data read out therefrom, and means for generating an error signal in the event of a mismatch. Carita U.S. Pat. No. 3,712,537 teaches an apparatus for detecting faults in the selection circuits of addressable memories, wherein the memory line selection switches are closed according to a predetermined sequence and the pattern of current flow through the switches is indicative of the presence of faults. Dynamic monitoring systems are typified by Giorcelli U.S. Pat. No. 4,030,074, Ling U.S. Pat. No. 3,771,131, and Sargent U.S. Pat. No. 3,309,678, wherein a unit to be tested does not have to be in a "rest" state.

Generally, in the computer monitoring art, monitoring is accomplished by a program subroutine or, alternatively, redundant computations are employed with a subsequent comparison therebetween to annunicate disagreement.

The present invention is related to the provision of a monitoring approach for data processing systems of the type employing a plurality of devices each interfacing with common address data and control buses. The common bus interconnects the various processors memories and peripheral devices with data transfer between any pair of devices being possible without processor intervention. These types of systems are currently employed in the art and might be termed adaptive processing systems.

In an adaptive processing system, communications between devices on the common bus is in the form of a master-slave relationship, and at any point in time only one device can have control of the bus. To complete data transfers, the master (controlling) device waits for a response from the slave (addressed) device. Potential masters connected to the transfer bus compete for control through a positional priority scheme. A known system of this type is described in a publication entitled "Collins Adaptive Processing System (CAPS) Transfer Bus" a publication of Collins Avionics Group/Rockwell International Corporation, publication number 523-0768040-001117, dated July 15, 1977. In this type of system, two classes of devices connect to a common transfer bus which includes address and data parallel lines. Master devices connect to the buses and control data transfers, while slave devices supply or accept data in response to a master's request. Data transfers in either direction always occur between one master and one or more slaves. There may be several slaves and potential masters on the same bus, and the masters are dynamically activated one at a time as their need for a data transfer arises. A central processing unit is a typical master device while a memory module would be classified as a slave device. In this type of system, if the CPU is to have even rudimentary intelligence, it is manditory for the common transfer bus to function correctly. Typically, the common bus interfaces with each of the slaves and masters via buffering interface devices, and should any one of these interface devices fail, to a low state for example, any ensuing computation is invalid. In present usages, as in a multichannel, fault tolerant, computational system, it is imperative that any failure of one computation channel be recognized and immediate remedial action taken. In this way, the accumulation of faults in the multiple channels is prevented and orderly system degregation and recovery are insured. For example, in an autopilot system, the failure of an interface device communicating with a common transfer bus completely destroys the computation ability of the system, and the detection of such failure might be utilized to initiate a system shutdown and disconnect for purposes of safety. The need arises, then, for a monitoring system for such a common parallel communication bus which will annunciate bus fault conditions on a dynamic basis without interference with the normal computation activity of the system.

Uniquely, in the above referenced and described adaptive processing systems, there exists in the common control bus between master and slave devices a discrete control line exhibiting first and second logic levels respectively indicative of whether the bus is "busy" or "at rest". Here the term "busy" infers that the parallel lines in the data and address buses are being utilized for a data transfer and/or addressing purposes, while the term "at rest" infers that the data and address bus lines are not being so employed. During "at rest" intervals, a predefined logic level, as defined by the system interfaces to the bus, exists on the lines. For example, during conditions of the bus being "at rest", all lines in the bus, as established by the bus interface circuitry, might be at a zero logic level or alternatively, at some system defined permutation of binary levels.

OBJECTS AND FEATURES OF THE INVENTION

The primary object of the present invention is the provision of dynamic monitoring device for a data processing employing plural devices interfacing with common address data and control buses.

A further object is to provide such a dynamic monitoring system which does not require a system program subroutine for operation.

A still further object is the provision of a dynamic monitoring system for a data processor of the type employing plural devices interfacing with common address data and control buses which annunciates failure of any device interfacing with the common transfer bus by development of a discrete latched monitor output logic level.

The present invention is featured in the provision of a logic comparator device whereby each line of parallel data and address buses in a system is compared with a known "at rest" defined logic level for that line. Line-by-line valid comparisons result in a first comparator output logic level, while a bad comparison between any one line and its reference level results in a comparitor output of a second logic level. A monitor output binary latch, set to a predetermined binary level output upon system turn-on, is permitted to be reset by a bad comparison dictated logic output from the comparitor only during those time intervals when the common system bus is not busy. Thus, the monitor output latch provides a bus failure output logic level indicating that one or more of the bus signal lines is bad. The monitor thus operates dynamically during normal operation of the data processing system by continuously comparing each parallel bus line to a reference logic level, and only during those predetermined time intervals when bus "at rest" condition dictates a system defined logic level permutation on the parallel bus lines, is a "bad" comparison effective in annunciating a bus fault. In effecting comparison and invalidity annunciation during existing "at rest" intervals of the bus, the monitor effects a dynamic comparison without interference in any way with the normal bus function in the system.

Figure 2:
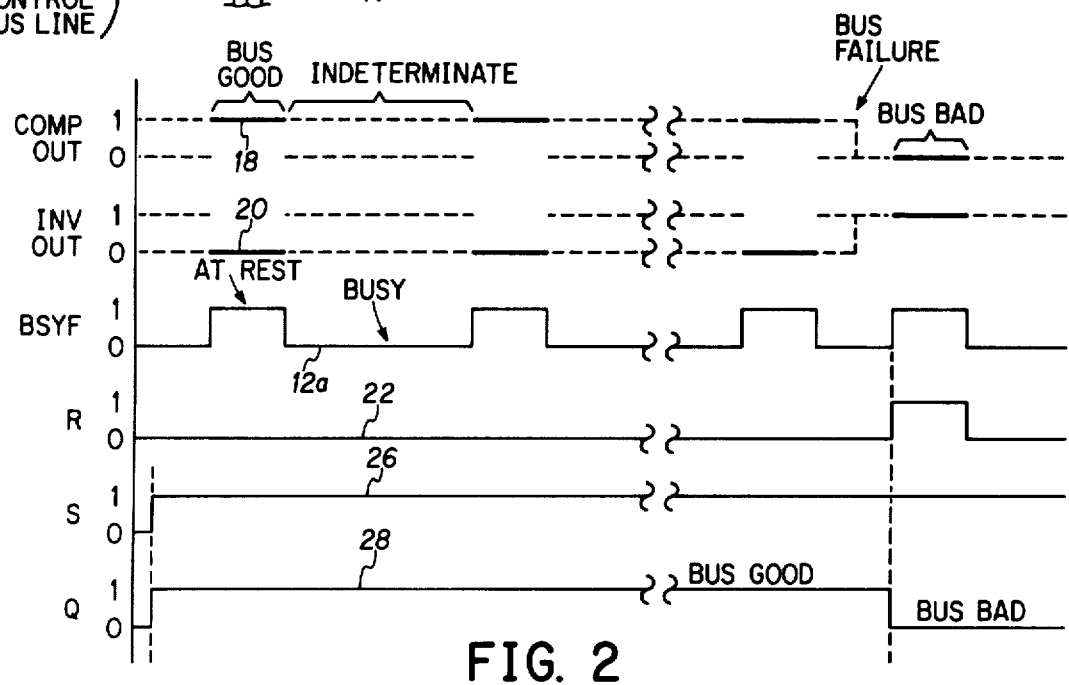

These and other features and objects of the invention will become apparent upon reading the following description with reference to the accompanying drawing, in which:

FIG. 1 is a functional block diagram of the bus monitor of the present invention as utilized in a data processing system employing a common transfer bus interfacing with plural devices; and FIG. 2 depicts operational waveforms of the bus monitor of FIG. 1.

Referring to FIG. 1, a data processing system of the above-described type is functionally depicted as comprising a common address bus 10, a common data bus 11, and a common control bus 12, all of which interface with master and slave devices. A slave device 13, which might comprise a memory, is shown interfaced with address bus 10 and data bus 11. A pair of master devices 14 and 15 are exampled as being interfaced with address bus 10, data bus 11, and control bus 12. The master devices 14 and 15 might, for example, comprise a pair of central processing units (CPU's). It is to be realized that any number of master and slave devices might be interfaced with the common address, data, and control buses. Each of the common buses comprises a parallel bus having a predetermined number of parallel lines, the control bus 12 being represented by a single line 12a which is pertinent to the monitoring system, and upon which discrete logic levels are imparted to indicate whether or not the address bus 10 and/or data bus 11 are busy.

For purposes of the present invention, the "bus busy" line 12a of the control bus 12, as depicted in FIG. 1, exhibits a zero logic level when the address and data buses are employed in computation, and a logic one level under bus "at rest" conditions. Line 12a is accordingly labeled BSYF (bus busy false) to indicate that when any master device of the system is utilizing the address and data buses, the bus busy line 12a is asserted to logic zero; that is, BSYF asserted.

Bus comparator 16 receives the paralleled inputs from the lines comprising the address bus 10 and the data bus 11 as respective first inputs thereto. Bus comparator 16 additionally receives a comparison value input 17 which comprises a paralleled input corresponding bit by bit with the binary state which should exist on each of the lines comprising the address and data buses when these buses are in an "at rest" state. Bus comparitor 16 might, for example, comprise a commercially available National DM7136 a product of National Semiconductor Corporation as identified in the National Semiconductor TTL Data Book, dated February 1976, page 3–19. Comparitor 16 develops a binary one logic level output on output line 18, if all lines of the address and data buses exhibit binary states which agree with the associated comparison value logic level for that line. Should one or more of the plural lines associated with the address and data buses not agree with its "at rest" comparison value as inputted to comparitor 16 on input 17, the output 18 from bus comparitor 16 comprises a logic zero level.

However, since, as aforedescribed, the data and address buses only periodically exhibit "at rest" conditions, as defined by the BSYF control bus line logic level, the output 18 of comparitor 16 can serve as an annunciation of failure of one or more of the address and data bus lines only when these lines are not busy and exhibit a predetermined known logic state permutation. For this purpose, the output 18 from bus comparitor 16 is inverted at 19 with the output 20 from inverter 19 being applied as a first input to an AND gate 21. The bus busy control line 12a (BSYF) is applied as a second input to AND gate 21. The ANDing of the inverted bus comparitor output with the BSYF line develops a logic one output on AND gate output 20 only when a bus failure condition output from comparitor 16 occurs during the assertion time of BSYF on line 12a, that is, only when the comparitor produces a failure indicative output during a period of time when the address and data buses are "at rest". It is to be realized that during intervening periods, when the address and data lines are being utilized for addressing and data transfer functions, any output from comparitor 16 would be indeterminate.

Output 22 from AND gate 21 is applied to monitor output latch 23. Output latch 23 might comprise a set-reset flip-flop with the output 22 from AND gate 21 applied as a reset input thereto. Flip-flop 23 receives a set input from the computer system power supply. As depicted in FIG. 1, power supply 24 includes a power monitoring system 25 from which is developed a power status control logic level output 26. For purposes of the present invention, the set input to flip-flop 23 must experience a zero-to-one logic level transition prior to application of power to the master and slave devices of the computation system via power supply output line 27. Power monitor 25, which among other functions of determining loss of power and initiating computer power-down routines as is well known in the art, develops a power status control signal on line 26 in FIG. 1, which is asserted to a logic level zero prior to the actual application of power to the computer. That is, the time occurrence of the power status control signal depicted functionally in FIG. 1 on line 26 is prior to the actual application of power to the master and slave devices depicted in the computation system of FIG. 1. Therefore, upon system turn-on, flip-flop 23 is set, via the positive excursion of the power status control pulse on line 26, to a logic one Q output, which, for purposes of the present invention, is interpreted as a "good" bus condition. The logic one output level on the Q output 28 of flip-flop 23 remains in a latched state until the application of a logic one reset input to the flip-flop 23 as applied via line 22. Thus, the bus comparitor 16 continuously compares bus "at rest" comparison values on input line 17 with the instant logic levels on the parallel lines making up the address and data buses. Only during those periods of time when the BSYF input 12a to AND gate 21 indicates the buses are in an "at rest" condition, will a comparator output level indicative of a "bad" bus be permitted to effect reset of flip-flop 23 to a logic zero Q output.

The transfer bus monitor thus tests for improper "at rest" states of the data and address buses in the computer system. Normally in such systems the data and address buses assume a particular logic state; for example, a low or logic zero state, when the bus is not in use. The aforedescribed monitor detects the nonuse of the bus by means of the discrete logic level of the bus busy control line 12a to validate the comparator output. If any inconsistency exits, a logic zero output appears on the Q output 28 of flip-flop 23. This logic zero output may be utilized to activate a bus invalidity annunciator 29 and/or be tied to the system power supply 24 to utilize this zero logic level, indicative of a bad bus condition, to initiate power turnoff or power-down routines in the computation system.

It should be noted that the failure indicating means described herein determines that the address and data bus itself is bad, that is, at least one line of these buses is failed to some fixed logic level, such as failure to ground. Thus, while the failure indicating means described indicates that the bus itself is bad, or that bus interface is bad, a "good" indication from the monitor as exhibited on output 28 from flip-flop 23 does not guarantee a successful bus transaction. However, when a bus failure is detected, a clear error producing state, as concerns the computation system, is assured.

As above discussed, the type of monitor herein described is particularly significant in digital flight control systems, wherein the output from the monitor may be utilized as an element in the system executive monitoring scheme. Since bus failure assures invalidity of system computation, the inclusion of the monitor herein described may be considered to be of the same order of significance as a system power monitor utilized to effect computer power-down and memory preservation should power failure be imminent. Further the bus invalidity provided by the monitor herein described may add considerable information when trouble shooting a data processing system with unknown faults, wherein the detection of an invalid bus would substantially reduce the trouble shooting by concentrating diagnosis efforts.

By way of operational summary, the transfer bus monitor of the present invention tests for improper "at rest" states of the data and address buses in a computer system employing common address and data parallel bus lines. The monitor detects the nonuse, of the bus, enables a comparison test of logic states on the bus lines, and if an inconsistency exists, produces an output logic level indication to annunciate the failure of the bus.

Functional waveforms depicting the operation of the monitoring system herein described are depicted in FIG. 2. The uppermost waveforms in FIG. 2 show the output 18 from bus comparator 16 and the corresponding output 20 from inverter 19 during time periods when the comparator output is indicative of a good bus, as evidenced by logic level one, and with a bus failure causing the output from comparator 16 to exhibit a logic zero state indicative of a bad bus condition. The comparator output heavy line portions, as well as the inverter output heavy line portions, are so indicated as being indicative of those periods of time when the bus is in an "at rest" condition as exhibited by logic level one on the BSYF line 12a. Phantom-line intervals in the comparator and inverter output waveforms represent those intervals corresponding to the bus being busy, wherein the particular output from the comparator would be indeterminate as concerns definition of good or bad bus status. Waveform R represents the output 22 from AND gate 21, this output being at a logic zero level until the time occurrence of, and for the duration of, the next ensuing BSYF logic one interval following bus failure time. Waveform S depicts the power status control pulse applied on line 26 to the set input of flip-flop 23. This signal exhibits a transition to logic one prior to actual computer operation, and sets the Q output 28 of flip-flop 23 to a logic one level (indicative of a good bus condition). The logic one level Q output 28 from flip-flop 23 is maintained in a latched condition until the reset input 22 from AND gate 21 goes to a logic one level to indicate a bus failure condition, whereupon flip-flop 23 is reset to a logic zero output level indicative of bus failure, with the logic zero level being a latched condition.

The monitoring system of the present invention is thus seen to provide for continuous dynamic monitoring of failure of the address and data buses 10 and 11. Bus condition monitoring is effected during "at rest" states of the bus, with failure being annunciated at the conclusion of a "bus busy" interval. The monitoring system requires no subroutine in the computation program while operating dynamically in concert with the normal operation of the computation system.

Although the present invention has been described with respect to a particular embodiment thereof, changes might be made therein which fall within the scope of the invention as defined in the appended claims.

What is claimed is:

1. In a data processing system employing a plurality of devices each having an interface with common parallel address, data and control buses and wherein one line of said control bus comprises a control signal having a predetermined binary level signal thereon when said address and data buses are in a rest state; monitoring means comprising a comparator means receiving said data and address bus lines as respective first inputs thereto and, as a second input thereto a set of comparison values for respective ones of said bus lines corresponding to the normal state thereof under said rest conditions, said comparitor means providing an output logic level of a first binary level when the logic levels of all respective ones of said bus lines and comparison values agree and a second binary level when the logic levels of at least one pair of respective ones of said bus lines and comparison values disagree, binary latch means having a set and reset input, means initially setting said latch means for a first predetermined binary level, and logic means resetting said latch means to a second binary level upon said comparitor means outputting said second binary level and said one line of said control bus exhibiting said rest state defined binary level, and the output of said latch means comprising the output of said monitoring means.

2. The data processing system of claim 1, with the rest state binary level of said control line being like that of said comparitor means output under conditions of an invalid comparison, and said logic means comprising means for gating said comparitor means output as a reset input to said latch means as a function of the rest state defined logic level of said control line.

* * * * *